United States Patent
Katano et al.

(10) Patent No.: US 9,981,557 B2
(45) Date of Patent: May 29, 2018

(54) FUEL CELL SYSTEM FOR VEHICLE

(71) Applicant: TOYOTA JIDOSHA KABUSHIKI KAISHA, Toyota-shi, Aichi-ken (JP)

(72) Inventors: Koji Katano, Toyota (JP); Hiroyuki Sekine, Nisshin (JP); Tsutomu Shirakawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/444,810

(22) Filed: Feb. 28, 2017

(65) Prior Publication Data

US 2017/0253126 A1    Sep. 7, 2017

(30) Foreign Application Priority Data

Mar. 3, 2016  (JP) .................................. 2016-040597

(51) Int. Cl.
| | |
|---|---|
| *B60L 3/00* | (2006.01) |
| *B60L 11/18* | (2006.01) |
| *H01M 8/04082* | (2016.01) |
| *H01M 8/04858* | (2016.01) |
| *H01M 16/00* | (2006.01) |
| *H01M 8/1018* | (2016.01) |

(52) U.S. Cl.
CPC ............. *B60L 3/00* (2013.01); *B60L 11/1883* (2013.01); *B60L 11/1896* (2013.01); *B60L 11/1898* (2013.01); *H01M 8/0488* (2013.01); *H01M 8/04201* (2013.01); *H01M 16/006* (2013.01); *H01M 2008/1095* (2013.01); *H01M 2250/20* (2013.01); *H01M 2250/402* (2013.01)

(58) Field of Classification Search
CPC ..................... H01M 2250/20; H01M 10/4257
See application file for complete search history.

(56) References Cited

U.S. PATENT DOCUMENTS

2015/0246621 A1    9/2015   Katano et al.

FOREIGN PATENT DOCUMENTS

| | | |
|---|---|---|
| JP | 2013-247083 | 12/2013 |
| JP | 2015-71389 | 4/2015 |

*Primary Examiner* — Olatunji Godo
(74) *Attorney, Agent, or Firm* — Finnegan, Henderson, Farabow, Garrett & Dunner, LLP

(57) ABSTRACT

The disclosure provides a fuel cell system for a vehicle. The fuel cell system includes a fuel cell stack disposed in a front room of a vehicle; and a converter assembly. The converter assembly disposed above or below the fuel cell stack includes: a converter; a first connector section; and a second connector section. The second connector section connects the converter assembly and a second electrical instrument which uses a high voltage. The second connector section is disposed behind the first connector section in a front-rear direction of the vehicle, and when the first connector section and the second connector section are seen from the front-rear direction of the vehicle, the first connector section and at least a portion of the second connector section are overlapped each other.

11 Claims, 5 Drawing Sheets

FUEL CELL SYSTEM FOR VEHICLE

INCORPORATION BY REFERENCE

The disclosure of Japanese Patent Application No. 2016-040597 filed on Mar. 3, 2016 including the specification, drawings and abstract is incorporated herein by reference in its entirety.

BACKGROUND

1. Technical Field

The present disclosure relates to a fuel cell system for a vehicle.

2. Description of Related Art

A fuel cell system including a fuel cell stack and a converter configured to boost a voltage of electric power generated by the fuel cell stack is known as a fuel cell system used for a vehicle. In a fuel cell system disclosed in Japanese Patent Application Publication No. 2013-247083 (JP 2013-247083 A), a fuel cell stack is disposed below a floor panel of a vehicle and a converter is disposed below the floor panel of the vehicle and in a center tunnel formed between a driver's seat and a passenger's seat. The converter is electrically connected to other instruments such as a power control unit (hereinafter referred to as "a PCU") or the like in the center tunnel.

SUMMARY

When a fuel cell stack is disposed in a front room serving as a front space of a cabin of a vehicle and a converter assembly including a converter is disposed above the fuel cell stack, a connector section to which the converter assembly and another high voltage instrument (for example, a PCU) are electrically connected may be protected from an external force from a forward side generated due to collision or the like of the vehicle. Meanwhile, in order to protect the connector section connected to the high voltage instrument, installing a separate protective member around the connector section can also be considered. However, when such a protective member is installed, the protective member is an obstacle to work when an instrument or parts mounted on the vehicle are assembled to the vehicle, and assemblability may deteriorate. The present disclosure provides a technology capable of protecting a connector section connected to a high voltage instrument from an external force from a forward side without a separate protective member being installed when a fuel cell stack is disposed in a front room of a vehicle and a converter assembly is disposed above the fuel cell stack.

The present disclosure can be realized in the following aspects.

The disclosure provides a fuel cell system for a vehicle. The fuel cell system according to an aspect of the disclosure includes a fuel cell stack and a converter assembly. The fuel cell stack is disposed in a front room of a vehicle. And the converter assembly includes: a converter configured to boost a voltage of electric power generated in the fuel cell stack; a first connector section configured to electrically connect a first electrical instrument mounted on the vehicle and the converter assembly; and a second connector section configured to electrically connect a second electrical instrument mounted on the vehicle and the converter assembly. The second electrical instrument is configured to use a voltage higher than that of the first electrical instrument. And the converter assembly is disposed above the fuel cell stack or below the fuel cell stack in a vehicle-height direction of the vehicle. The second connector section is disposed behind the first connector section in a front-rear direction of the vehicle, and when the first connector section and the second connector section are seen from the front-rear direction of the vehicle, the first connector section and at least a portion of the second connector section are overlapped each other.

According to the above-mentioned fuel cell system, the external force transmitted to the second connector section can be weakened by the first connector section because the external force from the forward side of the vehicle is transmitted in sequence to the first connector section and the second connector section. For this reason, the second connector section to which the electrical instrument that uses a high voltage is connected can be protected from the external force from the forward side without a member configured to protect the second connector section being separately installed.

In the aspect of the disclosure, the converter assembly may include a third connector section to which a service plug configured to cut off electrical connection between the second connector section and the converter assembly is connected. The third connector section may be disposed behind the first connector section in the front-rear direction of the vehicle. And when the first connector section and the third connector section are seen from the front-rear direction of the vehicle, the first connector section and at least a portion of the third connector section may be overlapped each other.

According to the above-mentioned fuel cell system, the external force transmitted to the third connector section can be weakened by the first connector section because the external force from the forward side of the vehicle is transmitted in sequence to the first connector section and the third connector section. For this reason, the third connector section configured to cut off electrical connection between the second connector section to which the electrical instrument that uses a high voltage is connected and the converter assembly can be protected from the external force from the forward side without a member configured to protect the third connector section being separately installed.

In the aspect of the disclosure, the converter assembly may include a third connector section to which a service plug configured to cut off electrical connection between the second connector section and the converter assembly is connected. The third connector section may be disposed behind the first connector section in the front-rear direction of the vehicle. And the third connector section may be disposed behind the second connector section in the front-rear direction of the vehicle. When the second connector section and the third connector section are seen from the front-rear direction of the vehicle, the second connector section and at least a portion of the third connector section may be overlapped each other.

In the aspect of the disclosure, the third connector section may be disposed behind the second connector section in the front-rear direction of the vehicle. And when the second connector section and the third connector section are seen from the front-rear direction of the vehicle, the second connector section and at least a portion of the third connector section may be overlapped each other.

According to the above-mentioned fuel cell system, even when the rear side of the converter assembly interferes with another member or instrument of the vehicle due to collision from the forward side of the vehicle, the force transmitted from the other member or instrument of the vehicle to the rear side of the converter assembly is transmitted in sequence to the third connector section and the second connector section. For this reason, the force transmitted to the second connector section can be weakened by the third connector section, and the second connector section can be protected from the other member or instrument of the vehicle. Accordingly, the second connector section can be further protected without a member configured to protect the second connector section being separately installed. In addition, since the service plug is connected to the third connector section and the service plug can be used as a protective member for the third connector section, even when the rear side of the converter assembly interferes with the other member or instrument of the vehicle due to collision from the forward side of the vehicle, the third connector section can be protected from the other member or instrument of the vehicle without a member configured to protect the third connector section being separately installed.

In the aspect of the disclosure, the converter assembly may include side surfaces, and the first connector section and the second connector section may be disposed at a same side surface among the side surfaces of the converter assembly.

According to the above-mentioned fuel cell system, assemblability of a wire harness to the connector sections can be improved.

In the aspect of the disclosure, the converter assembly may include side surfaces, and the first connector section, the second connector section and the third connector section may be disposed on a same side surface among the side surfaces.

According to the above-mentioned fuel cell system, assemblability of a wire harness to the connector sections can be improved.

In the aspect of the disclosure, the first connector section and the second connector section may be disposed at the same position in the vehicle-height direction of the vehicle.

In the aspect of the disclosure, the first connector section, the second connector section and the third connector section may be disposed at the same position in the vehicle-height direction of the vehicle.

In the aspect of the disclosure, the converter assembly may be disposed above the fuel cell stack in the vehicle-height direction of the vehicle.

In the aspect of the disclosure, the first connector section and the second connector section may be disposed at a side surface directed in a vehicle-width direction of the vehicle.

In the aspect of the disclosure, the first connector section, the second connector section and the third connector section may be disposed at a side surface directed in a vehicle-width direction of the vehicle.

The present disclosure can also be realized in various forms other than the above-mentioned fuel cell system for a vehicle. For example, the system can be realized in a form such as a vehicle on which the fuel cell system is mounted, or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
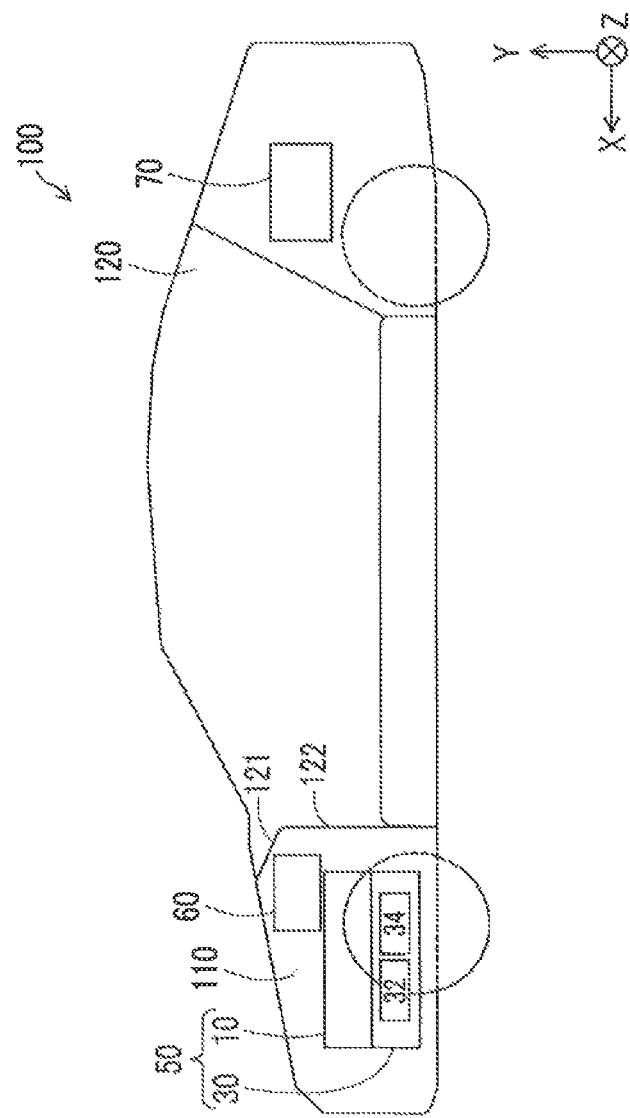
FIG. 1 is a view showing a schematic configuration of a vehicle on which a fuel cell system for a vehicle serving as a first embodiment of the present disclosure is mounted.

FIG. 1 is a view showing a schematic configuration of a vehicle 100 on which a fuel cell system 50 for a vehicle serving as a first embodiment of the present disclosure is mounted. In FIG. 1, X, Y and Z axes perpendicular to one another are shown. A +X direction shows a direction in which the vehicle 100 advances. The +X direction is "a forward direction" of the vehicle 100. A −X direction shows a direction in which the vehicle 100 reverses. The −X direction is "a rearward direction" of the vehicle 100. The X directions are "a front-rear direction" of the vehicle 100. A +Z direction is "a rightward direction" of the vehicle 100. A −Z direction is "a leftward direction" of the vehicle 100. The Z directions are also "a vehicle-width direction" of the vehicle 100 or "a right-left direction" of the vehicle 100. A +Y direction is "an upward direction" of the vehicle 100 and a −Y direction is "a downward direction" of the vehicle 100. The Y directions are "a vertical direction" of the vehicle 100 or "a vehicle-height direction" of the vehicle 100. These directions are used in the same manner in the other drawings. FIG. 1 is a view showing the vehicle 100 from the left side.

The vehicle 100 includes the fuel cell system 50, a power control unit 60 (hereinafter, the PCU 60) and a secondary battery 70. The vehicle 100 further includes a motor for driving wheels, a fuel gas tank (not shown), or the like. In addition, the vehicle 100 includes a front room 110 and a cabin 120. The front room 110 is disposed in front of the cabin 120, and disposed in front of a dash panel 122 and a cowl 121 that constitute the cabin 120. The cowl 121 is a connecting place between a front glass and a hood.

The fuel cell system 50 is disposed in the front room 110 of the vehicle 100. The fuel cell system 50 includes a fuel cell stack assembly (hereinafter, an FC stack assembly) 30 and a converter assembly 10. In the embodiment, the fuel cell system 50 is configured by fastening the FC stack assembly 30 serving as a box body and the converter assembly 10 serving as a box body.

The FC stack assembly 30 includes a fuel cell stack 32 and a fluid delivery unit 34. The fuel cell stack 32 is formed by, for example, stacking solid polymer type fuel cells. Various pipelines such as a pipeline configured to supply an oxidizing gas into the fuel cell stack 32, a pipeline configured to supply a fuel gas, or the like, are connected to the fluid delivery unit 34. The fluid delivery unit 34 includes various auxiliary machines used to deliver a reactant gas, for example, an air compressor, a fuel gas pump, various valves, an injector, sensors, or the like. The fuel cell stack 32 generates power using a fuel gas supplied from the fuel gas tank mounted on the vehicle 100 via the fluid delivery unit 34 and air supplied as an oxidizing gas from around the vehicle 100 via the fluid delivery unit 34.

The converter assembly 10 is disposed above the FC stack assembly 30 in the front room 110. The converter assembly 10 is a package including a converter configured to boost a voltage of electric power generated by the FC stack assembly 30 (the fuel cell stack 32). The voltage of the electric power generated by the FC stack assembly 30 is boosted by the converter assembly 10, and used as electric power for driving a motor mounted on the vehicle 100. The converter assembly 10 of the embodiment can boost the voltage of the electric power generated by the FC stack assembly 30 to 650 V maximally. In the embodiment, the FC stack assembly 30 and the converter assembly 10 are electrically connected to the inside of the fuel cell system 50 shown in FIG. 1.

The secondary battery 70 is disposed behind the cabin 120 of the vehicle 100. The secondary battery 70 functions as an auxiliary power supply of the FC stack assembly 30. The secondary battery 70 may be constituted by, for example, a lithium ion battery or a nickel hydrogen battery that is chargeable and dischargeable. The secondary battery 70 accumulates electric power generated by the fuel cell system 50 or electric power regenerated upon deceleration.

Figure 2:
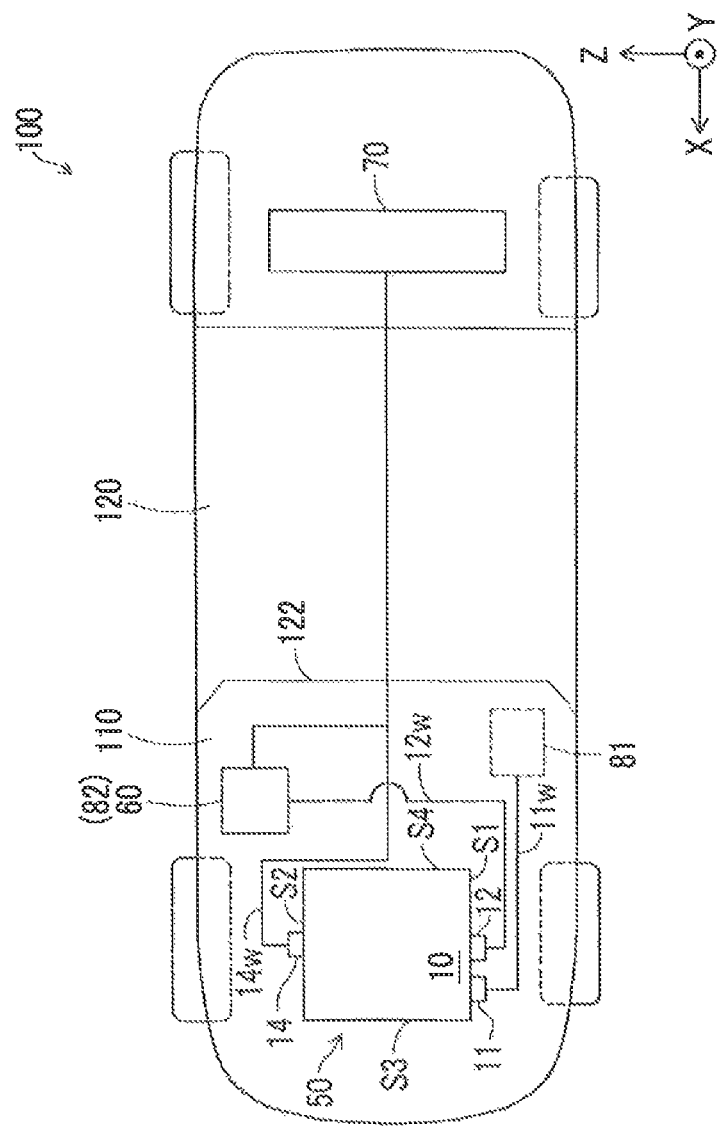
FIG. 2 is a view showing the vehicle from above.

FIG. 2 is a view showing the vehicle 100 from above. The PCU 60 is disposed in the front room 110 of the vehicle 100. In the embodiment, the PCU 60 is disposed at a right side of the fuel cell system 50 in the front room 110. The PCU 60 includes an inverter, and converts the electric power output from the fuel cell system 50 from direct current to alternating current. The electric power generated by the fuel cell system 50 and converted by the PCU 60 is output to the motor. In addition, the PCU 60 accumulates electric power regenerated by the motor in the secondary battery 70.

The converter assembly 10 includes a first connector section 11 and a second connector section 12. The second connector section 12 is disposed behind the first connector section 11 in the vehicle 100, and when the first connector section 11 and the second connector section 12 are seen from a front surface side of a forward side of the vehicle 100, the first connector section 11 covers at least a portion of the second connector section 12. In other words, when the first connector section 11 is seen from the front surface side of the forward side of the vehicle 100, at least a portion of the first connector section 11 overlaps the second connector section 12. The converter assembly 10 includes a plurality of side surfaces. Specifically, in the embodiment, the converter assembly 10 includes a front side surface S3, a rear side surface S4, a left side surface S1, a right side surface S2, a top side surface, and a bottom side surface. The front side surface S3, the rear side surface S4, the left side surface S1, the right side surface S2, the top side surface, and the bottom side surface of the converter assembly 10 face the forward direction, the rearward direction, the leftward direction, the rightward direction, the upward direction, and the downward direction of the vehicle 100, respectively. In the embodiment, the first connector section 11 and the second connector section 12 are disposed at the left side surface S1, among the plurality of side surfaces of the converter assembly 10. In the embodiment, positions in the vertical direction of the first connector section 11 and the second connector section 12 are substantially the same positions, and when the first connector section 11 and the second connector section 12 are seen from the front surface side of the forward side of the vehicle 100, the first connector section 11 substantially covers the second connector section 12. Further, in the embodiment, the second connector section 12 is disposed to be separated from the side surface S4 of the rear side of the converter assembly 10. Further, in the specification, "when the first connector section 11 and the second connector section 12 are seen from the front surface side of the forward side of the vehicle 100" means "when the first connector section 11 is seen from the front surface of the forward side of the vehicle 100 along the X axis." In addition, this means "when the first connector section 11 is seen from a perpendicular line drawn from the first connector section 11 to an imaginary YZ plane of the front surface of the forward side of the vehicle 100."

The first connector section 11 is a connecting section configured to electrically connect a first electrical instrument 81 mounted on the vehicle 100 and the converter assembly 10. The first electrical instrument 81 is an instrument that uses a low voltage (a low voltage instrument). For example, a voltage of 12 V is output to the first electrical instrument 81 connected to the first connector section 11 via a wire harness 11w. A control device configured to perform output requests to the fuel cell system 50 is included in the first electrical instrument 81 connected to the first connector section 11.

The second connector section 12 is a connecting section configured to electrically connect a second electrical instrument 82 mounted on the vehicle 100 and the converter assembly 10. The second electrical instrument 82 is an instrument (a high voltage instrument) that uses a voltage higher than that of the first electrical instrument 81. For example, a maximum voltage of 650 V is output to the second electrical instrument 82 connected to the second connector section 12 via a wire harness 12w. The PCU 60 is included in the second electrical instrument 82 connected to the second connector section 12.

The converter assembly 10 according to the embodiment further includes a fourth connector section 14 formed at the side surface S2 of the right side. The fourth connector section 14 is formed to be separated at the rear side from the side surface S3 of the front side of the converter assembly 10. In the embodiment, the position in the front-rear direction of the fourth connector section 14 is substantially the same as the position of the second connector section 12. A pump inverter or the like that uses a high voltage is connected to the fourth connector section 14. In addition, for example, the electric power output from the secondary battery 70 and converted by the PCU 60 is supplied to the fourth connector section 14 via a wire harness 14w.

Figure 3:
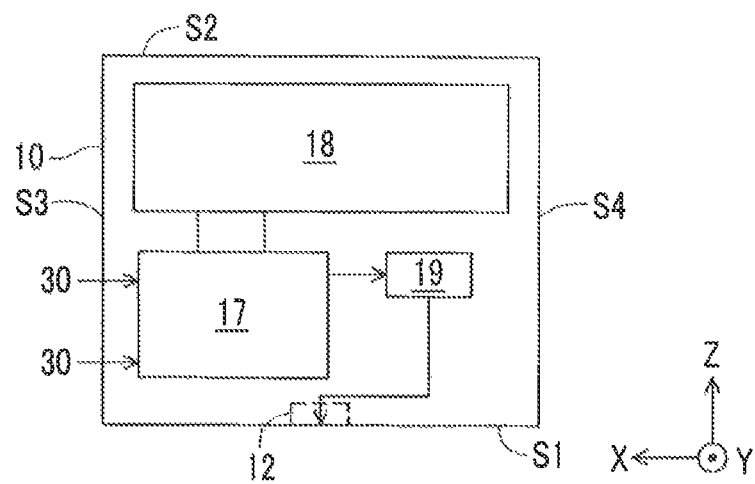
FIG. 3 is a schematic view showing a converter assembly according to the first embodiment.
Figure 4:
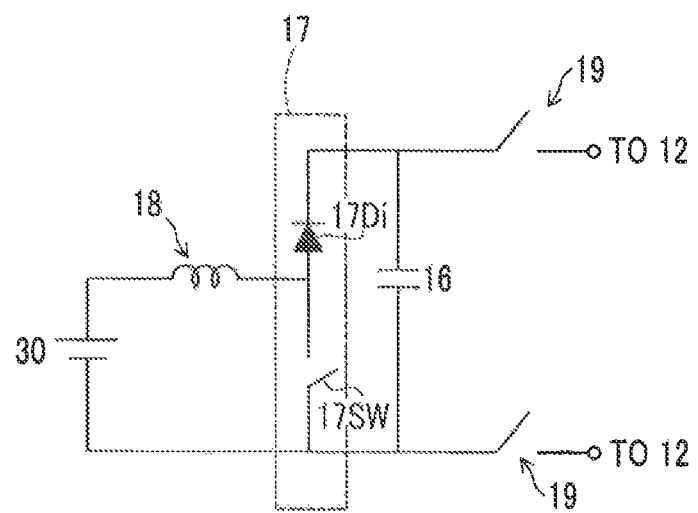
FIG. 4 is a schematic view showing a circuit configuration of the converter assembly according to the first embodiment.

FIG. 3 is a schematic view showing the converter assembly 10. FIG. 3 is a schematic view showing the converter assembly 10 from above, and schematically shows a current path to the second connector section 12. FIG. 4 is a schematic view showing a circuit configuration of the converter assembly 10. The converter assembly 10 mainly includes the power module 17 (an intelligent power module, hereinafter, an IPM 17) having a switching element 17SW and a diode 17Di, a capacitor 16, a reactor 18 and a relay 19. An opening/closing operation of the relay 19 is controlled by a control device (not shown), and electrical connection between the converter assembly 10 and a second electrical instrument connected to the second connector section 12 is opened and closed. The converter assembly 10 further includes a control board (not shown) configured to control the IPM 17. The control board is disposed, for example, above the IPM 17.

In the embodiment, in the converter assembly 10, the IPM 17 is disposed in front of the vicinity of the left side surface S1. In addition, the relay 19 is disposed behind the IPM 17. The relay 19 is connected to the second connector section 12.

In the embodiment, when the fuel cell stack 32 is disposed in the front room 110 of the vehicle 100 and the converter assembly 10 is disposed above the fuel cell stack 32, a technology capable of protecting the second connector section 12 connected to the high voltage instrument from an external force from a forward side without a separate protective member being installed is provided. In general, the converter assembly 10 includes the first connector section 11 connected to the low voltage instrument, in addition to the second connector section 12 connected to the high voltage instrument. According to the fuel cell system 50 of the above-mentioned embodiment, the second connector section 12 installed at the converter assembly 10 is disposed behind the first connector section 11 in the vehicle 100. In addition, when the first connector section 11 and the second connector section 12 are seen from the front surface side of the forward side of the vehicle 100, the first connector section 11 covers at least a portion of the second connector section 12. Accordingly, since an external force from the forward side of the vehicle 100 caused by collision is transmitted in sequence to the first connector section 11 and the second connector section 12, the external force transmitted to the second connector section 12 can be weakened by the first connector section 11. For this reason, the second connector section 12 to which the electrical instrument that uses a high voltage is connected can be protected from the external force from the forward side without a member configured to protect the second connector section 12 being separately installed. In addition, since the member configured to protect the second connector section 12 need not be separately installed, assemblability of assembling the instrument or parts mounted on the vehicle 100 to the vehicle can be maintained.

In addition, since the first connector section 11 and the second connector section 12 are disposed at the same side surface (the left side surface S1) among the plurality of side surfaces of the converter assembly 10, in comparison with the case in which the second connector section 12 and the first connector section 11 are disposed at different side surfaces, assemblability of the wire harness to the connector sections can be improved.

In addition, in the converter assembly 10, since the IPM 17 is disposed in front of the vicinity of the side surface S1, the relay 19 is disposed behind the IPM 17 and the relay 19 is connected to the second connector section 12 disposed behind the first connector section 11, a current path in the converter assembly 10 can be shortened and simplified. For this reason, the converter assembly 10 can be reduced in size. For this reason, a degree of freedom in design of the vehicle 100 can be improved.

In addition, since the positions in the vertical direction of the first connector section 11 and the second connector section 12 are substantially the same position, in comparison with the case in which the positions in the vertical direction of the first connector section 11 and the second connector section 12 are different from each other, a thickness of the converter assembly 10 can be reduced and a degree of freedom in design of the vehicle 100 can be improved.

In addition, the first connector section 11 and the second connector section 12 are disposed at the side surface directed in the right-left direction among the plurality of side surfaces of the converter assembly 10. Accordingly, for example, in comparison with the case in which the first connector section 11 and the second connector section 12 are disposed at the top side surface of the converter assembly 10, a thickness of the converter assembly 10 can be reduced and a degree of freedom in design of the vehicle 100 can be improved.

In addition, in the embodiment, since the fourth connector section 14 is formed to be separated at the rear side from the side surface S3 of the front side of the converter assembly 10, in comparison with the case in which the fourth connector section 14 is formed in the vicinity of the side surface S3 of the front side of the converter assembly 10, the fourth connector section 14 to which the electrical instrument that uses a high voltage is connected can be protected from the external force from the forward side.

Further, since the fuel cell system 50 of the embodiment is disposed in the front room 110 of the vehicle 100, for example, in comparison with the case in which the fuel cell system 50 is disposed under the cabin 120 of the vehicle 100, a degree of freedom in design of the cabin 120 can be improved.

B. Second Embodiment

Figure 5:
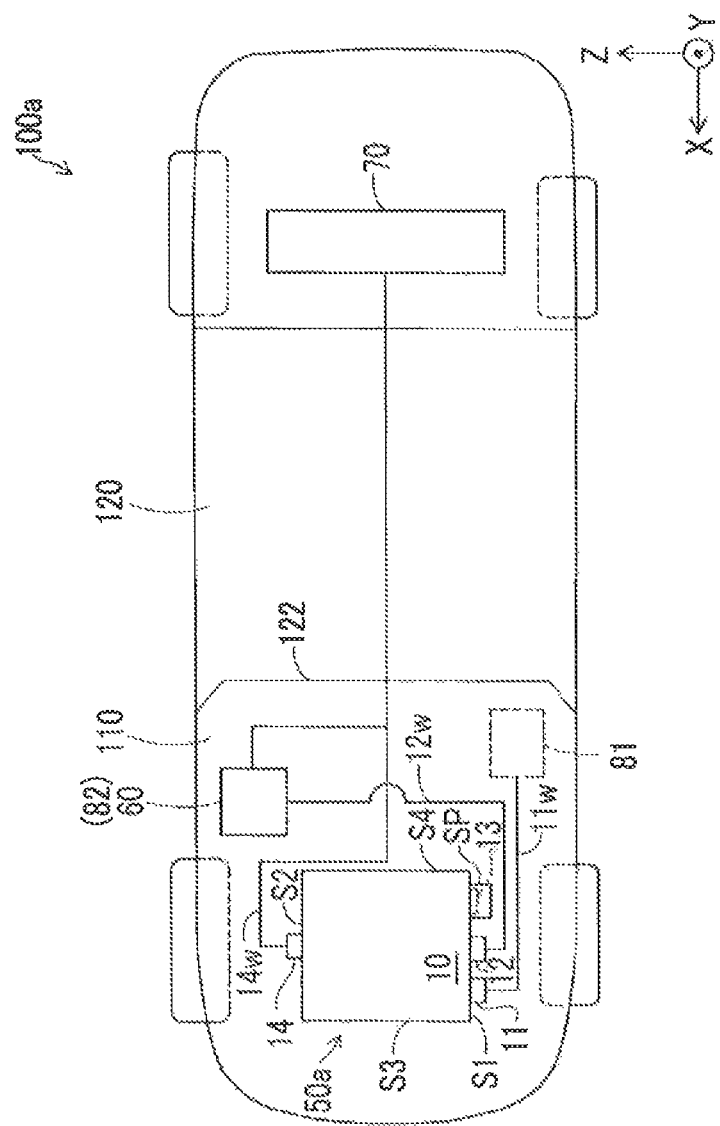
FIG. 5 is a view showing a schematic configuration of a vehicle on which a fuel cell system for a vehicle serving as a second embodiment of the present disclosure is mounted.

FIG. 5 is a view showing a schematic configuration of a vehicle 100a on which a fuel cell system 50a for a vehicle serving as a second embodiment of the present disclosure is mounted. FIG. 5 is a view showing the vehicle 100a from above. The fuel cell system 50a of the embodiment is distinguished from the fuel cell system 50 of the above-mentioned first embodiment in that a third connector section 13 is installed at a converter assembly 10a.

The third connector section 13 is a connecting section to which a service plug SP configured to cut off electrical connection between the second connector section 12 and the converter assembly 10a is connected. In the fuel cell system 50a shown in FIG. 5 an aspect in which the service plug SP is connected to the third connector section 13 is shown. The service plug SP is a structure connected to the third connector section 13 to cover the third connector section 13. The third connector section 13 is disposed behind the first connector section 11 in the vehicle 100a, and when the first connector section 11 and the third connector section 13 are seen from a front surface side of a forward side of the vehicle 100a, the first connector section 11 covers at least a portion of the third connector section 13. In other words, when the first connector section 11 is seen from the front surface side of the forward side of the vehicle 100a, at least a portion of the first connector section 11 overlaps the third connector section 13. Further, in the specification, "when the first connector section 11 and the third connector section 13 are seen from the front surface side of the forward side of the vehicle 100a" means "when the first connector section 11 is seen from the front surface of the forward side of the vehicle 100a along the X axis." In addition, this means "when the first connector section 11 is seen from a perpendicular line drawn from the first connector section 11 to an imaginary YZ plane of the front surface of the forward side of the vehicle 100a."

In addition, in the embodiment, the third connector section 13 is disposed behind the second connector section 12 in the vehicle 100a, and when the second connector section 12 and the third connector section 13 are seen from the front surface side of the forward side of the vehicle 100a, the second connector section 12 covers at least a portion of the third connector section 13. In other words, when the second connector section 12 is seen from the front surface side of the forward side of the vehicle 100a, at least a portion of the second connector section 12 overlaps the third connector section 13. Further, in the specification, "when the second connector section 12 and the third connector section 13 are seen from the front surface side of the forward side of the vehicle 100a" means "when the second connector section 12 is seen from the front surface of the forward side of the vehicle 100a along the X axis." In addition, this means "when the second connector section 12 is seen from a perpendicular line drawn from the second connector section 12 to an imaginary YZ plane of the front surface of the forward side of the vehicle 100a." In the embodiment, the connector sections in the converter assembly 10a are disposed in sequence of the first connector section 11, the second connector section 12 and the third connector section 13 from the forward side of the vehicle 100a. In addition, in the embodiment, the first connector section 11, the second connector section 12 and the third connector section 13 are disposed at the left side surface S1 among the plurality of side surfaces of the converter assembly 10a. In addition, in the embodiment, the positions in the vertical direction of the first connector section 11, the second connector section 12 and the third connector section 13 are substantially the same positions, and when the first connector section 11, the second connector section 12 and the third connector section 13 are seen from the front surface side of the forward side of the vehicle 100a, the first connector section 11 substantially covers the second connector section 12 and the third connector section 13. In addition, when the second connector section 12 and the third connector section 13 are seen from the front surface side of the forward side of the vehicle 100a, the second connector section 12 substantially covers the third connector section.

Figure 6:
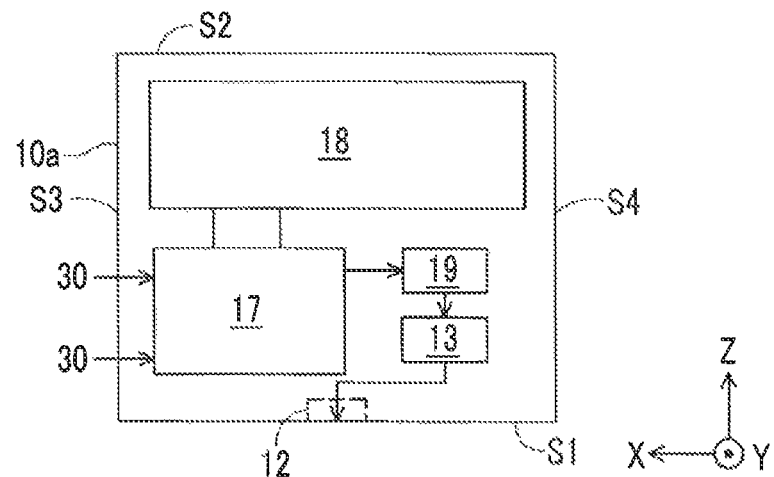
FIG. 6 is a schematic view showing a converter assembly according to the second embodiment from above.
Figure 7:
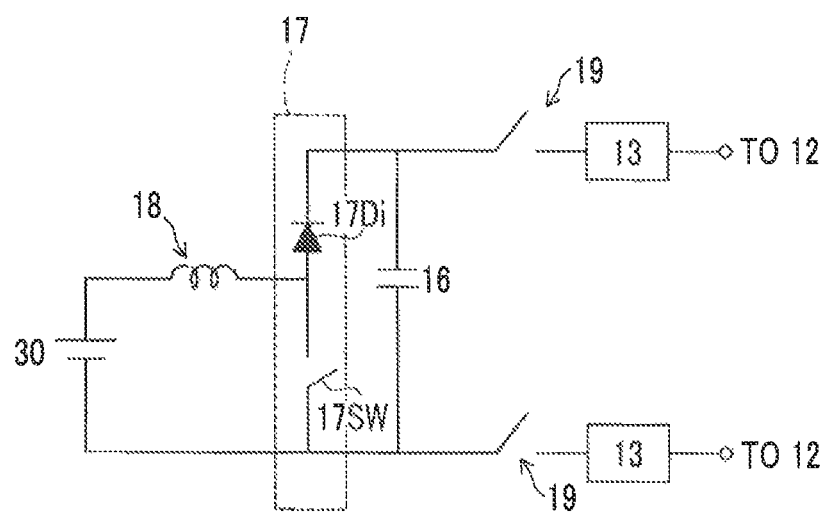
FIG. 7 is a schematic view showing a circuit configuration of the converter assembly according to the second embodiment.

FIG. 6 is a schematic view showing the converter assembly 10a from above. In FIG. 6, a current path to the second connector section 12 is schematically shown. In addition, FIG. 7 is a schematic view showing a circuit configuration of the converter assembly 10a. As shown in FIG. 6 and FIG. 7, the third connector section 13 for the service plug SP is connected to the current path between the relay 19 and the second connector section 12. When the service plug SP is pulled out, for example, in maintenance or the like of the vehicle 100a, electrical connection between the second connector section 12 and the converter assembly 10a is cut off. Since other configurations of the fuel cell system 50a of the embodiment are the same as those of the fuel cell system 50 of the above-mentioned first embodiment, description thereof will be omitted.

According to the fuel cell system 50a of the embodiment, the third connector section 13 to which the service plug SP is connected is disposed behind the first connector section 11 in the vehicle 100a. In addition, when the first connector section 11 and the third connector section 13 are seen from the front surface side of the forward side of the vehicle 100a, the first connector section 11 covers at least a portion of the third connector section 13. Accordingly, since an external force from the forward side of the vehicle 100a is transmitted in sequence to the first connector section 11 and the third connector section 13, the external force transmitted to the third connector section 13 is weakened by the first connector section 11. For this reason, the third connector section 13 configured to cut off the electrical connection between the second connector section 12 to which the second electrical instrument is connected and the converter assembly 10a can be protected from the external force from the forward side without a member configured to protect the third connector section 13 being separately installed.

In addition, in the fuel cell system 50a of the embodiment, the third connector section 13 is disposed behind the second connector section 12 to which the second electrical instrument is connected in the vehicle 100a. In addition, when the second connector section 12 and the third connector section 13 are seen from the front surface side of the forward side of the vehicle 100a, the second connector section 12 covers at least a portion of the third connector section 13. For this reason, even when the rear side of the converter assembly 10a interferes with other members or instruments of the vehicle 100a due to collision from the forward side of the vehicle 100a, a force transmitted from the other member or instrument of the vehicle 100a toward the rear side of the converter assembly 10a is transmitted in sequence to the third connector section 13 and the second connector section 12. Accordingly, the force transmitted to the second connector section 12 can be weakened by the third connector section 13, and the second connector section 12 can be protected from the other members or instruments of the vehicle 100a. Accordingly, the second connector section 12 can be further protected without a member configured to protect the second connector section 12. Interference with the other members or instruments means, for example, application of the force from the other member or instrument to the converter assembly 10a. The other member is, for example, the dash panel 122, the cowl 121, or the like, disposed behind the converter assembly 10a. The other instruments include, for example, the control device (not shown), the PCU 60, or the like, disposed around the rear side of the converter assembly 10a.

In addition, in the embodiment, since the service plug SP is connected to the third connector section 13, the service plug SP can be used as a protective member for the third connector section 13. Accordingly, even when the rear side of the converter assembly 10a interferes with the other member or instrument of the vehicle 100a due to collision from the forward side of the vehicle 100a, the third connector section 13 can be protected from the other member or instrument of the vehicle 100a without a member configured to protect the third connector section 13 being separately installed.

In addition, since the fuel cell system 50a of the embodiment includes the same configuration as the fuel cell system 50 of the above-mentioned first embodiment except that the third connector section 13 is provided, the same effect as the above-mentioned first embodiment is exhibited.

C. Modified Example

While the converter assembly 10 or 10a and the FC stack assembly 30 are received in different box bodies in the above-mentioned embodiment, the converter assembly 10 or 10a and the FC stack assembly 30 may be received in one box body. The converter assembly 10 or 10a may be disposed below the FC stack assembly 30.

While the converter assembly 10 or 10a includes the front side surface S3, the rear side surface S4, the left side surface S1, the right side surface S2, the top side surface and the bottom side surface in the above-mentioned embodiment, the number of side surfaces of the converter assembly 10 or 10a is not limited thereto. For example, the number of side surfaces provided in the converter assembly 10 or 10a may be further increased. In addition, for example, a concavo-convex shape may be formed at a portion of an exterior of the converter assembly 10 or 10a.

In the above-mentioned first embodiment, the first connector section 11 and the second connector section 12 are disposed at the left side surface S1 among the side surfaces of the converter assembly 10. On the other hand, the second connector section 12 is disposed behind the first connector section 11 in the vehicle 100, and when the first connector section 11 and the second connector section 12 are seen from the front surface side of the forward side of the vehicle 100, the first connector section 11 and the second connector section 12 may be disposed on different side surfaces as long as the first connector section 11 covers at least a portion of the second connector section 12.

In the above-mentioned second embodiment, the first connector section 11, the second connector section 12 and the third connector section 13 are disposed on the left side surface S1 among the side surfaces of the converter assembly 10a. On the other hand, the second connector section 12 and the third connector section 13 are disposed behind the first connector section 11 in the vehicle 100a, and when the first connector section 11, the second connector section 12 and the third connector section are seen from the front surface side of the forward side of the vehicle 100a, the connector sections may be disposed on different side surfaces as long as the first connector section 11 covers at least a portion of the second connector section 12 and the third connector section 13.

In the above-mentioned second embodiment, the third connector section 13 of the converter assembly 10a is disposed behind the second connector section 12, and when the second connector section 12 and third connector section 13 are seen from the front surface side of the forward side of the vehicle 100a, the second connector section 12 covers at least a portion of the third connector section 13. On the other hand, the second connector section 12 and the third connector section 13 are disposed behind the first connector section 11 in the vehicle 100a, and when the first connector section 11, the second connector section 12 and the third connector section 13 are seen from the front surface side of the forward side of the vehicle 100a, the positions in the front-rear direction of the second connector section 12 and the third connector section 13 may be the same position and the second connector section 12 may be disposed behind the third connector section 13 as long as the first connector section 11 covers at least a portion of the second connector section 12 and the third connector section 13.

In the above-mentioned embodiment, the positions in the vertical direction of the connector sections are substantially the same positions. On the other hand, the second connector section 12 is disposed behind the first connector section 11 in the vehicle 100 or 100a, and when the first connector section 11 and the second connector section 12 are seen from the front surface side of the forward side of the vehicle 100 or 100a, the positions in the vertical direction of the connector sections may be different as long as the first connector section 11 covers at least a portion of the second connector section 12.

The present disclosure is not limited to the above-mentioned embodiments or modified examples but various configurations may be made without departing from the spirit of the present disclosure. For example, technical features in the embodiments or modified examples corresponding to technical features in the aspects disclosed in Summary of the Disclosure may be appropriately replaced or combined in order to solve some or all of the above-mentioned tasks or accomplish some or all of the above-mentioned effects.

What is claimed is:

1. A fuel cell system for a vehicle comprising:
   a fuel cell stack disposed in a front room of a vehicle; and
   a converter assembly including:
   a converter configured to boost a voltage of electric power generated in the fuel cell stack;
   a first connector section configured to electrically connect a first electrical instrument mounted on the vehicle and the converter assembly; and
   a second connector section configured to electrically connect a second electrical instrument mounted on the vehicle and the converter assembly, the second electrical instrument configured to use a voltage higher than that of the first electrical instrument, the converter assembly being disposed above the fuel cell stack or below the fuel cell stack in a vehicle-height direction of the vehicle, wherein
   the second connector section is disposed behind the first connector section in a front-rear direction of the vehicle, and when the first connector section and the second connector section are seen from the front-rear direction of the vehicle, the first connector section and at least a portion of the second connector section are overlapped each other.

2. The fuel cell system for the vehicle according to claim 1, wherein
   the converter assembly includes a third connector section to which a service plug configured to cut off electrical connection between the second connector section and the converter assembly is connected,
   the third connector section is disposed behind the first connector section in the front-rear direction of the vehicle, and
   when the first connector section and the third connector section are seen from the front-rear direction of the vehicle, the first connector section and at least a portion of the third connector section are overlapped each other.

3. The fuel cell system for the vehicle according to claim 1, wherein
   the converter assembly includes a third connector section to which a service plug configured to cut off electrical connection between the second connector section and the converter assembly is connected,
   the third connector section is disposed behind the first connector section in the front-rear direction of the vehicle, and is disposed behind the second connector section in the front-rear direction of the vehicle, and
   when the second connector section and the third connector section are seen from the front-rear direction of the vehicle, the second connector section and at least a portion of the third connector section are overlapped each other.

4. The fuel cell system for the vehicle according to claim 2, wherein
   the third connector section is disposed behind the second connector section in the front-rear direction of the vehicle, and
   when the second connector section and the third connector section are seen from the front-rear direction of the vehicle, the second connector section and at least a portion of the third connector section are overlapped each other.

5. The fuel cell system for the vehicle according to claim 1, wherein
   the converter assembly includes side surfaces, and the first connector section and the second connector section are disposed at a same side surface among the side surfaces of the converter assembly.

6. The fuel cell system for the vehicle according to claim 2, wherein
   the converter assembly includes side surfaces, and the first connector section, the second connector section and the third connector section are disposed on a same side surface among the side surfaces.

7. The fuel cell system for the vehicle according to claim 5, wherein
the first connector section and the second connector section are disposed at a same position in the vehicle-height direction of the vehicle.

8. The fuel cell system for the vehicle according to claim 6, wherein
the first connector section, the second connector section and the third connector section are disposed at a same position in the vehicle-height direction of the vehicle.

9. The fuel cell system for the vehicle according to claim 1, wherein
the converter assembly is disposed above the fuel cell stack in the vehicle-height direction of the vehicle.

10. The fuel cell system for the vehicle according to claim 5, wherein
the first connector section and the second connector section are disposed at a side surface directed in a vehicle-width direction of the vehicle.

11. The fuel cell system for the vehicle according to claim 6, wherein
the first connector section, the second connector section and the third connector section are disposed at a side surface directed in a vehicle-width direction of the vehicle.

* * * * *